US008825184B2

(12) United States Patent
Burns

(10) Patent No.: US 8,825,184 B2
(45) Date of Patent: Sep. 2, 2014

(54) MULTIVARIABLE OPTIMIZATION OF OPERATION OF VAPOR COMPRESSION SYSTEMS

(75) Inventor: Dan J. Burns, Wakefield, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 292 days.

(21) Appl. No.: 13/430,436

(22) Filed: Mar. 26, 2012

(65) Prior Publication Data
US 2013/0247601 A1 Sep. 26, 2013

(51) Int. Cl.
| G05B 13/02 | (2006.01) |
| G06F 19/00 | (2011.01) |
| G01M 1/38 | (2006.01) |
| G05D 23/00 | (2006.01) |
| F24F 7/00 | (2006.01) |
| F25B 17/04 | (2006.01) |
| F25B 17/06 | (2006.01) |
| G06F 1/26 | (2006.01) |

(52) U.S. Cl.
USPC ............ 700/38; 700/28; 700/121; 700/276; 700/300; 236/49.3; 62/132; 62/186; 62/426; 713/320

(58) Field of Classification Search
USPC .......... 700/28–29, 31, 33, 38, 121, 276, 300; 236/49.3; 62/132, 186, 426; 713/320
See application file for complete search history.

(56) References Cited

U.S. PATENT DOCUMENTS

| 5,735,134 A * | 4/1998 | Liu et al. ......................... 62/230 |
| 6,098,010 A * | 8/2000 | Krener et al. ................. 701/100 |
| 6,742,347 B1* | 6/2004 | Kolk et al. ...................... 62/148 |
| 2003/0115895 A1* | 6/2003 | Beaverson et al. ............. 62/227 |
| 2009/0277197 A1* | 11/2009 | Gambiana et al. ............. 62/115 |
| 2011/0209486 A1* | 9/2011 | Burns et al. .................... 62/115 |
| 2011/0276182 A1* | 11/2011 | Seem et al. ................... 700/276 |
| 2012/0083926 A1* | 4/2012 | Seem ............................ 700/276 |
| 2012/0239165 A1* | 9/2012 | Li et al. ........................... 700/28 |

* cited by examiner

Primary Examiner — Darrin Dunn
(74) Attorney, Agent, or Firm — Dirk Brinkman; Gene Vinokur

(57) ABSTRACT

A method for operating a vapor compression system modifies each control signal of a set of control signals with a corresponding modification signal of a set of modification signals, wherein each modification signal includes a perturbation signal, and the pertubation signals haver different frequencies and determines a metric signal representing perturbations in the system caused by the set of modification signals. Next, the method adjusts a value of each modification signal based on a function of a phase between the modification signal and a corresponding frequency component of the metric signal.

11 Claims, 10 Drawing Sheets

300

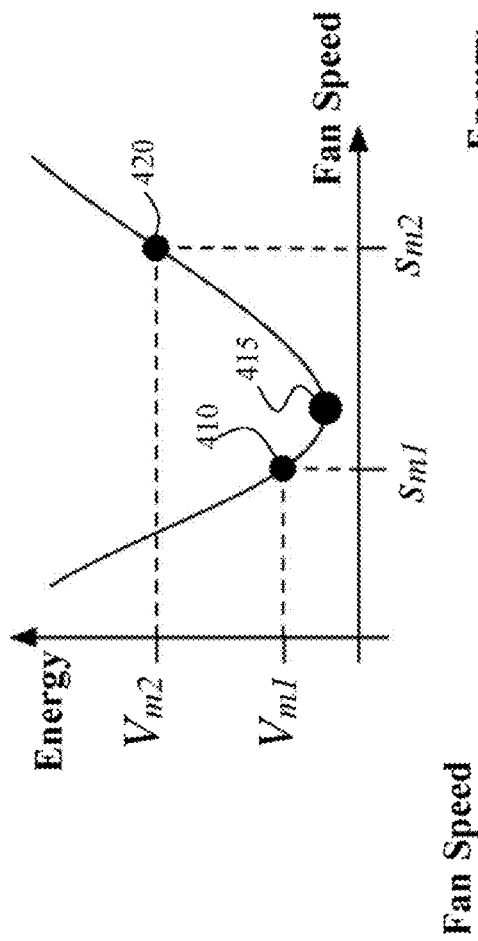
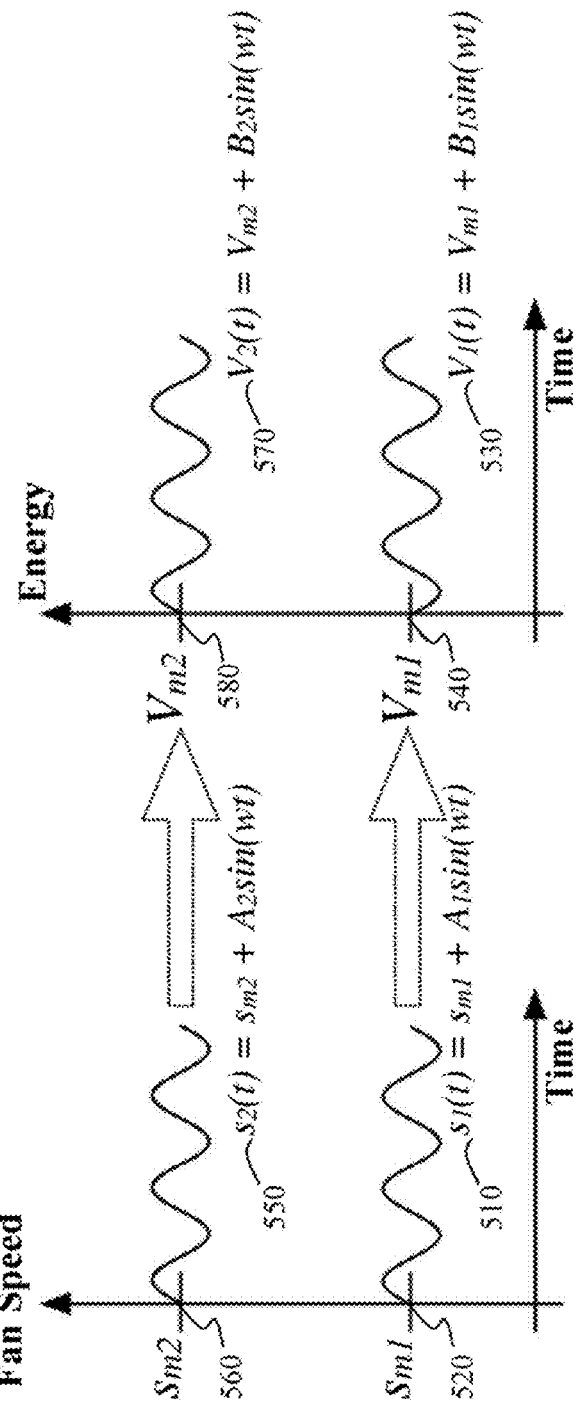
FIG. 5A
FIG. 5B
FIG. 5C

MULTIVARIABLE OPTIMIZATION OF OPERATION OF VAPOR COMPRESSION SYSTEMS

FIELD OF THE INVENTION

This invention relates generally to vapor compression systems, and more particularly to multivariable optimization of the vapor compression systems.

BACKGROUND OF THE INVENTION

Vapor compression systems, such as heat pumps, refrigeration and air-conditioning systems, are widely used in industrial and residential applications. The introduction of variable speed compressors, variable position valves, and variable speed fans to the vapor compression cycle has greatly improved the flexibility of the operation of such systems. It is possible to use these new components to improve the efficiency of vapor compression systems by controlling the components correctly.

For example, a speed of the compressor can be adjusted to modulate a flow rate of a refrigerant. The speed of an evaporator fan and a condenser fan can be varied to alter heat transfer coefficients between air and heat exchangers. The change in an expansion valve opening can directly influence a pressure drop between the high-pressure side and the low-pressure side of the vapor compression system, which, in turn, affects the flow rate of the refrigerant, as well as superheat at the corresponding evaporator outlet.

Additionally, vapor compression systems are becoming increasingly complex. Integrated systems with multiple indoor units connected to a single outdoor unit are common in residential applications, and some commercial applications employ vapor compression systems with multiple outdoor units and multiple indoor units, all under the direction of a single control system. It is understood that each unit mentioned above includes of a heat exchanger and may include a variable speed fan and/or a variable position expansion control device. Therefore, these complex systems are characterized by a large number of actuators. It is desirable to operate the system where each actuator is controlled such that energy consumption is optimized.

Vapor compression systems can consume large quantities of electrical energy, and therefore, incur a large operating cost. Accordingly, it is desired to determine control inputs that optimize a performance of the vapor compression system. One performance characteristic is optimal energy consumption. A number of methods for controlling operations of the vapor compression system are disclosed in the art.

For example, one method for controlling a vapor compression system, disclosed in U.S. Pat. No. 5,735,134, considers the possibility of sudden change in environmental or thermal load requirements, monitors the vapor compression system in real-time, and determines, based on these actual real-time measurements, a set of parameters to enable the system to operate at maximum coefficient of performance. However, that method is time consuming, and requires substantial real time computational resources and a mathematical model of the vapor compression system.

Another method, disclosed in U.S. Pat. No. 7,076,962, first determines an amount of thermal flow across an evaporator or a condenser. Next, the amount of thermal is used to determine a set of optimal control inputs. As the amount of thermal flow is directly related to the operation of the vapor compression system, this determination is difficult to avoid. However, that approach is not optimal because nonlinear phenomena do not substantially affect the efficiency of the components of the vapor compression system.

Another method, disclosed in U.S. Pat. No. 7,246,500, reduces energy consumption of the system by modulating the speed of a condenser fan of the vapor compression system. However, that method is suboptimal because other components of the system are not adjusted. Thus, a combination of operational parameters of various components of the vapor compression system is not optimized.

Yet another method, disclosed in JP 2000-257941, reduces energy consumption of cold water or hot-water in the air conditioner by measuring the room temperature with a thermometer and retrieving a value of a valve opening from a valve opening table using the room temperature as an index. However, conventional vapor compression systems typically have a number of different components, including but not limited to the valve, which need to be controlled concurrently. Moreover, that method determines the valve opening based on outside environment conditions only, which is not always optimal.

Accordingly, there is a need in the art for a control system and a method for controlling operation of the vapor compression system such that thermal load of the operation is met and a performance of the system is optimized.

Conventionally, methods maximizing energy efficiency rely on the use of mathematical models of the physics of vapor compression systems, as described, e.g., in U.S. Pat. No. 5,735,134. Those model-based methods attempt to describe the influence of commanded inputs of the components of the vapor compression system on the thermodynamic behavior of the system and the consumed energy. In those methods, models are used to predict the combination of inputs that both meets the thermal load requirements and minimizes energy.

However, the use of mathematical models for the selection of optimizing inputs has several important drawbacks. Firstly, models rely on simplifying assumptions to produce a tractable representation, and those simplifications are especially required for multi-unit vapor compression systems with complex physical interactions and numerous system actuators. Those assumptions often ignore important effects or do not consider installation-specific characteristics such as room sizes, causing the model of the system to deviate from an actual operation of the system.

Secondly, variations during the manufacturing process of those systems are often so large as to produce vapor compression systems of the same type that have different input-output characteristics, and therefore a single model cannot accurately describe the variations in the characteristics.

Thirdly, those models are difficult to derive and calibrate. For example, parameters that describe the operation of a component of a vapor compression system, e.g., a compressor, are experimentally determined for each type of the compressor used, and a model of a complete vapor compression system may have many such parameters. Determining the values of these parameters for each model is a difficult process.

Finally, vapor compression systems are known to vary over time. A model that accurately describes the operation of a vapor compression system at one time may not be accurate at a later time as the system changes, for example, due to slowly leaking refrigerant, or the accumulation of corrosion or debris on the heat exchangers.

FIG. 1 shows a conventional multi-unit vapor compression system 100 that includes components, e.g., variable setting actuators. Often, the multiple units are intended to allow the independent regulation of corresponding multiple room or zone temperatures. In the case where the vapor compression system is operated in a cooling mode, as shown in FIG. 1, heat is removed from the indoor units to the outdoor units and therefore the indoor units act as evaporators. Conversely, when operated in heating mode, which is not shown, heat is added to the indoor units from the outdoor units and the indoor units are act as condensers.

The components can include an evaporator fan 114, a condenser fan 113, an expansion valve 111, and a compressor 112. The system can be controlled by a supervisory controller 120 responsible for accepting setpoints 115, e.g., from a thermostat, and readings of a sensor 130, and outputting a set of control signals for controlling operation of the components. The supervisory controller 120 is operatively connected to a set of control devices for transforming the set of control signals into a set of specific control inputs for corresponding components. For example, a supervisory controller is connected to a compressor control device 122, to an expansion valve control device 121, to an evaporator fan control, device 124, and to a condenser fan control device 123. Also, it is possible to connect multiple heat exchangers to independently regulate multiple zone temperatures. Shown in FIG. 1 is a set of N evaporators in the vapor compression system. Each of these N evaporators may include corresponding evaporator fans 117, and those fans may be operatively connected to a corresponding fan control devices 126.

The multiple evaporators illustrate one of many configurations of multiple unit vapor compression systems. Other configurations of the vapor compression system may include multiple expansion valves, with, for example, one or more expansion valves for each evaporator. These multi-unit systems contain a large number of actuators, and it is desirable to operate the system so that each actuator is operated such that the overall system consumes minimum energy.

However, the operation of the system can be not optimal. In consideration of the above, there is a need in the art for a method for controlling operation of the vapor compression system such that heat load of the operation is met and a performance of the system is optimized, where the method is able to control many actuators concurrently, is not model-based, and can adapt over time as the system characteristics evolve.

SUMMARY OF THE INVENTION

It is an object of present invention to provide a system and a method for controlling the operation of a vapor compression system such that thermal load requirements of the operation are met, and a performance of the system is optimized. One measure of performance can be optimal energy consumption.

It is further object of the invention to provide such a system and a method that optimizes performance of the entire vapor compression system by controlling several components of the system concurrently. In particular, some embodiments describe a method for concurrent controlling of various actuators in a vapor compression system, so that the system converges to the optimal combination of all system actuators that achieve the desired thermal load at the maximum efficiency.

Some embodiments of the invention are based on a realization that the relationship between multiple actuators in a vapor compression system (compressor speed, evaporator fan speeds, condenser fan speeds, etc.) and the energy consumed to deliver a particular quantity of heat or cooling?? is convex. Thus, the energy consumed attains a minimum value for a particular combination of input values, and other combinations of input commands cause the vapor compression system to consume more energy. In other words, a particular combination of input values consumes a minimum amount of energy, which in turn maximizes efficiency.

It is further object of the invention to provide such a system and a method without using a model of the vapor compression system.

It is further object of the invention to provide such a system and a method that optimizes the performance of the system over time during the operation of the system even if operating characteristics of the system change.

It is further object of the invention to provide such a system and a method that optimizes performance of the system dynamically real time during the operation of the system.

It is further object of the invention to provide such a system and a method that have a simple design and can be adapted to various metrics of performance of the system.

It is further object of present invention to provide such a system and a method that enable the optimization of performance even in a presence of a sudden change of the thermal load during the operation of the system.

Some embodiments of the invention disclose a system and a method for controlling at least one component of a vapor compression system, such that a performance of the system, measured in accordance with a metric of performance, is optimized, e.g., maximized or minimized, during the operation of the vapor compression system.

Some embodiments of the invention are based on a realization that there is a convex relationship between an operation of a component of the vapor compression system and the performance of the system. The embodiments determine the relationship between the component and the performance at an operation point during the operation of the system, and use the relationship to modify a control signal controlling the operation of the component to optimize the performance, e.g., to minimize energy consumption of the system, or to maximize efficiency of the system. In various embodiments, the operation of one or several components is modified to optimize the performance.

This realization also allows optimizing the performance in real time during the operation of the vapor compression system without using a model of the system. Also, because the performance is optimized in real time, the change of the characteristics of the vapor compression system, such as leak of refrigerant or corrosion on the heat exchangers, has minimal effect on the embodiments.

Some embodiments are based on another realization that if the control signal is perturbed with a sinusoidal signal, the response of the vapor compression system caused by that perturbation is also sinusoidal and the direction toward the optimum operating point can be determined based on a function of phase of the sinusoidal signals. This realization allows determining the direction towards optimum using trigonometric operations, which simplifies the design and the complexity of some embodiments. Also, this realization enables some embodiments to optimize the performance even in a presence of a sudden change of the thermal load during the operation of the system. This is because response of the system to a sinusoidal perturbation is also sinusoidal with the same frequency. Thus, the changes to the thermal load of the system, e.g., opening a window in a room, can be treated as noise mixed with the sinusoidal response of the system, and the noise can be removed.

In some embodiments, multiple actuators can be concurrently optimized by modulating each actuator with signals of different frequencies. As a consequence, the performance metric is a single signal with a mixture of frequency components that are due to the multiple perturbation frequencies added to individual system actuators. Each sinusoidal perturbation causes a corresponding response in a metric of performance that can be demodulated. In this manner, the influence of one actuator is separated from the influence of any other, allowing independent simultaneous optimization of actuator values.

One aspect of the invention discloses a method for operating a vapor compression system, which modifies each control signal of a set of control signals with a corresponding modification signal of a set of modification signals, wherein each modification signal includes a perturbation signal, and the pertubation signals haver different frequencies. The method determines a metric signal representing perturbations in the system caused by the set of modification signals and adjusts a value of each modification signal based on a function of a phase between the modification signal and a corresponding frequency component of the metric signal. The steps of the method are performed by a processor.

For example, the function of the phase can include at least one of a sign of the phase, and a shift of the phase. The metric of the performance can include an efficiency of the vapor compression system, and the adjusting also includes increasing a value of the control signal, if the phase is positive; and decreasing the value of the control signal, if the phase is negative. Alternatively, the metric of the performance can include an energy consumption of the vapor compression system, and the adjusting further includes decreasing a value of the control signal, if the phase is positive; and increasing the value of the control signal, if the phase is negative.

In some embodiments, the method can determine a modification value, e.g., based on the function of the phase, and can change a value the modification signal based on the modification value. Alternatively, the method can change a value of the control signal based on the modification value.

In some embodiments, the method can include measuring an output signal of the vapor compression system representing the performance; and subjecting the output signal to a high-pass filter to produce the metric signal. The method can also include subjecting a product of the perturbation signal and the metric signal to a low-pass filter to produce a constant term of the product, wherein a sign of the constant term corresponds to the function of the phase; and determining a modification value based on the constant term.

In one embodiment, the method can include combining the modification value with the perturbation signal to produce the modification signal.

In some embodiments, the method can produce the modification value by integrating the constant term. Additionally or alternatively, the method can update the modification value by integrating the constant term. The method can also include multiplying the modification value with a gain factor, wherein a sign of the gain factor depends on the metric of performance. For example, the sign of the gain factor is positive, if the performance should be maximized. Alternatively, the sign of the gain factor is negative, if the performance should be minimized. The gain factor allows for changing the embodiment adaptively in dependence of the metric of performance.

Another aspect of the invention discloses a method for controlling an operation of a vapor compression system, such that a performance of the system measured in accordance with a metric of performance is optimized, wherein at least one component of the system is controlled based on a control signal. The method includes modifying the control signal with a modification signal having a modification value and a periodic perturbation signal; and adaptively adjusting the modification value based on a function of the perturbation signal and a metric signal representing a response in the performance caused by the modification signal, wherein the perturbation signal and the metric signal are sinusoidal signals having substantially identical frequency.

In one embodiment, the method can also include one or combination of determining a product of the perturbation signal and the metric signal, wherein the product includes a constant term and a sinusoidal term; updating the modification value based on a sign of the constant term; and multiplying the modification value by a gain factor, wherein a sign of the gain factor depends on the metric of performance.

Another aspect of the invention discloses an optimization controller for optimizing a performance of a vapor compression system measured in accordance with an metric of performance by concurrently controlling multiple system actuators. The optimization controller can include a repeated array of optimizing actuator controllers where each optimizing actuator controller can include: a perturbation module for generating a perturbation signal; a high-pass filter for determining a metric signal in response to receiving an output signal representing the performance of the system; a low-pass filter for determining a constant term of a product of the perturbation signal and the metric signal; an integrator for determining a modification value based on a sign of the constant term; and a summation module for combining the modification value with the perturbation signal to output the modification signal suitable for modifying a control signal of one component of the system. The outputs of the individual optimizing actuator controllers are in this manner concurrently determined, and the multivariable output of the optimizing controller is generated such that the overall performance is optimized.

In various embodiments, the optimization controller can also include one or combination of a gain factor module for multiplying the modification value by a gain factor, wherein a sign of the gain factor depends on the metric of performance; a delay module for delaying the output of the modification signal; a receiver for receiving the output signal; and a modification module for modifying the control signal with the modification signal.

Definitions

In describing embodiments of the invention, the following definitions are applicable throughout (including above).

A "computer" refers to any apparatus that is capable of accepting a structured input, processing the structured input according to prescribed rules, and producing results of the processing as output. Examples of a computer include a computer; a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "central processing unit (CPU)" or a "processor" refers to a computer or a component of a computer that reads and executes software instructions.

A "memory" or a "computer-readable medium" refers to any storage for storing data accessible by a computer. Examples include a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network, and a computer memory, e.g., random-access memory (RAM).

"Software" refers to prescribed rules to operate a computer. Examples of software include software; code segments; instructions; computer programs; and programmed logic. Software of intelligent systems may be capable of self-learning.

A "module" or a "unit" refers to a basic component in a computer that performs a task or part of a task. It can be implemented by either software or hardware.

A "control system" refers to a device or a set of devices to manage, command, direct or regulate the behavior of other devices or systems. The control system can be implemented by either software or hardware, and can include one or several modules. The control system, including feedback loops, can be implemented using a microprocessor. The control system can be an embedded system.

A "computer system" refers to a system having a computer, where the computer comprises computer-readable medium embodying software to operate the computer.

A "network" refers to a number of computers and associated devices that are connected by communication facilities. A network involves permanent connections such as cables, temporary connections such as those made through telephone or other communication links, and/or wireless connections. Examples of a network include an internet, such as the Internet; an intranet; a local area network (LAN); a wide area network (WAN); and a combination of networks, such as an internet and an intranet.

A "vapor compression system" refers to a system that uses the vapor compression cycle to move refrigerant through components of the system based on principles of thermodynamics, fluid mechanics, and/or heat transfer. The vapor compression systems can be, but are not limited to, a heat pump, refrigeration, and an air-conditioner system. The vapor compression systems are used in applications beyond the conditioning of residential or commercial spaces. For example, the vapor compression cycle can be used by the vapor compression system to cool computer chips in high-performance computing applications An "HVAC" system refers to any heating, ventilating, and air-conditioning (HVAC) system implementing the vapor compression cycle. HVAC systems span a very broad set of systems, ranging from systems which supply only outdoor air to the occupants of a building, to systems which only control the temperature of a building, to systems which control the temperature and humidity.

"Actuators of a vapor compression system" refer to any components of the vapor compression system having an operation controllable by the control systems. The actuators include, but are not limited to, a compressor having a variable speed for compressing and pumping the refrigerant through the system; an expansion valve for providing an adjustable pressure drop between the high-pressure and the low-pressure portions of the system, and an evaporating heat exchanger and a condensing heat exchanger, each of which incorporates a variable speed fan for adjusting the air-flow rate through the heat exchanger.

An "evaporator" refers to a heat exchanger in the vapor compression system in which the refrigerant passing through the heat exchanger evaporates over the length of the heat exchanger, so that the specific enthalpy of the refrigerant at the outlet of the heat exchanger is higher than the specific enthalpy of the refrigerant at the inlet of the heat exchanger, and the refrigerant generally changes from a liquid to a gas. There may be one or more evaporators in the vapor-compression system.

A "condenser" refers to a heat exchanger in the vapor compression system in which the refrigerant passing through the heat exchanger condenses over the length of the heat exchanger, so that the specific enthalpy of the refrigerant at the outlet of the heat exchanger is lower than the specific enthalpy of the refrigerant at the inlet of the heat exchanger, and the refrigerant generally changes from a gas to a liquid. There may be one or more condensers in a vapor-compression system.

"Thermodynamic parameters" refer to a set of measurements of physical parameters of the vapor compression system. These parameters include, but are not limited to, temperatures of the air and the refrigerant and pressures of the air and the refrigerant, as well as properties of the refrigerant at various points in the system, such as density, enthalpy, and entropy.

"Set of control signals" refers to specific values of the inputs for controlling the operation of the components of the vapor compression system. The set of control signals includes, but are not limited to, values of the speed of the compressor, the position of the expansion valve, the speed of the fan in the evaporator, and the speed of the fan in the condenser.

A "setpoint" refers to a target value the system, such as the vapor compression system, aim to reach and maintain as a result of the operation. The term setpoint is applied to any particular value of a specific set of control signals and thermodynamic and environmental parameters.

BRIEF DESCRIPTION OF THE DRAWINGS

FIGS. 5A-5C are graphs diagrams of input-output variations of a convex performance index at two operating points when sinusoidal signals are applied showing the phase dependency on the location of the current operating point relative to the optimal operating point;

DETAILED DESCRIPTION OF EMBODIMENTS OF INVENTION

Figure 1:
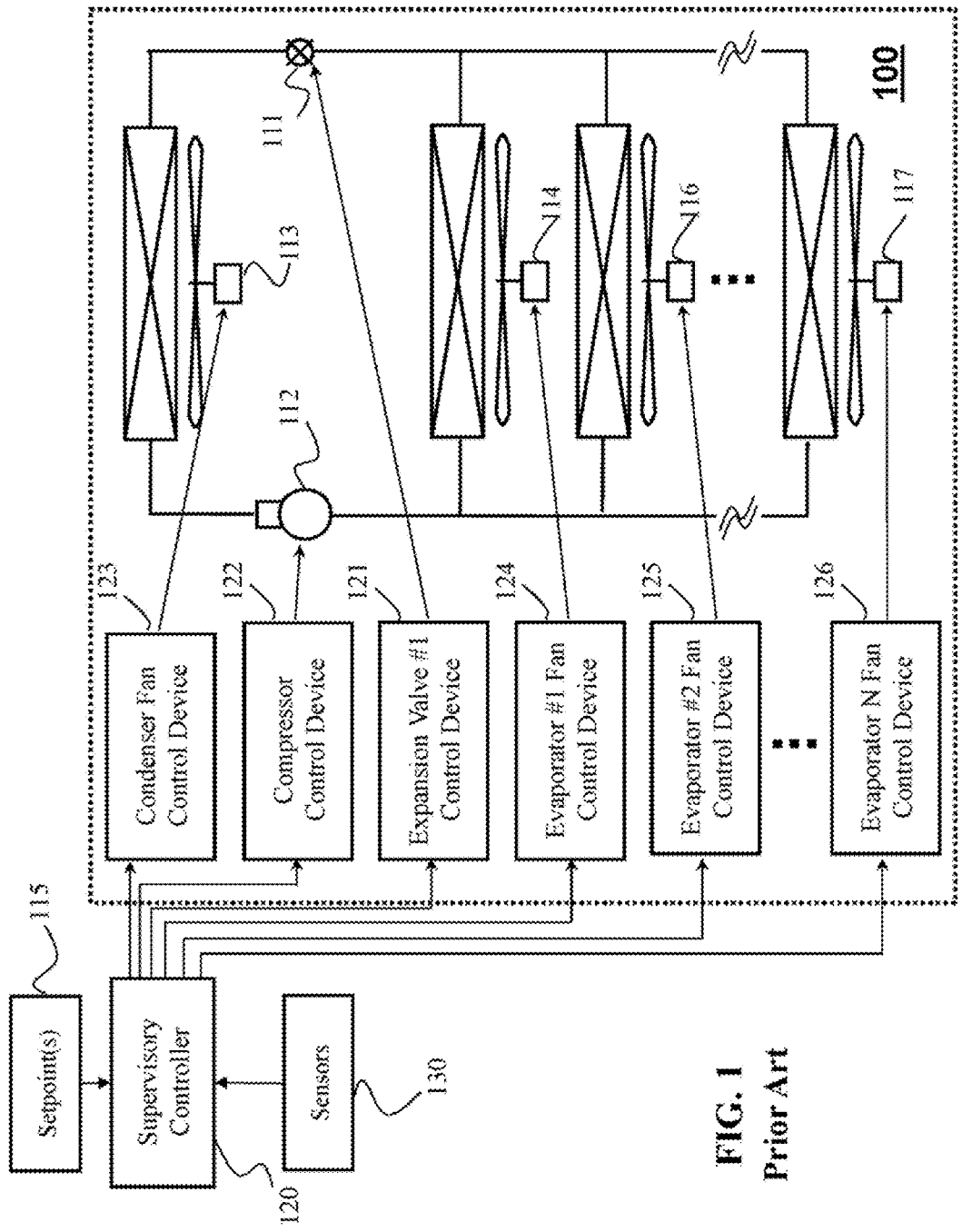
FIG. 1 is a block diagram of a conventional multi-unit vapor compression system.
Figure 2:
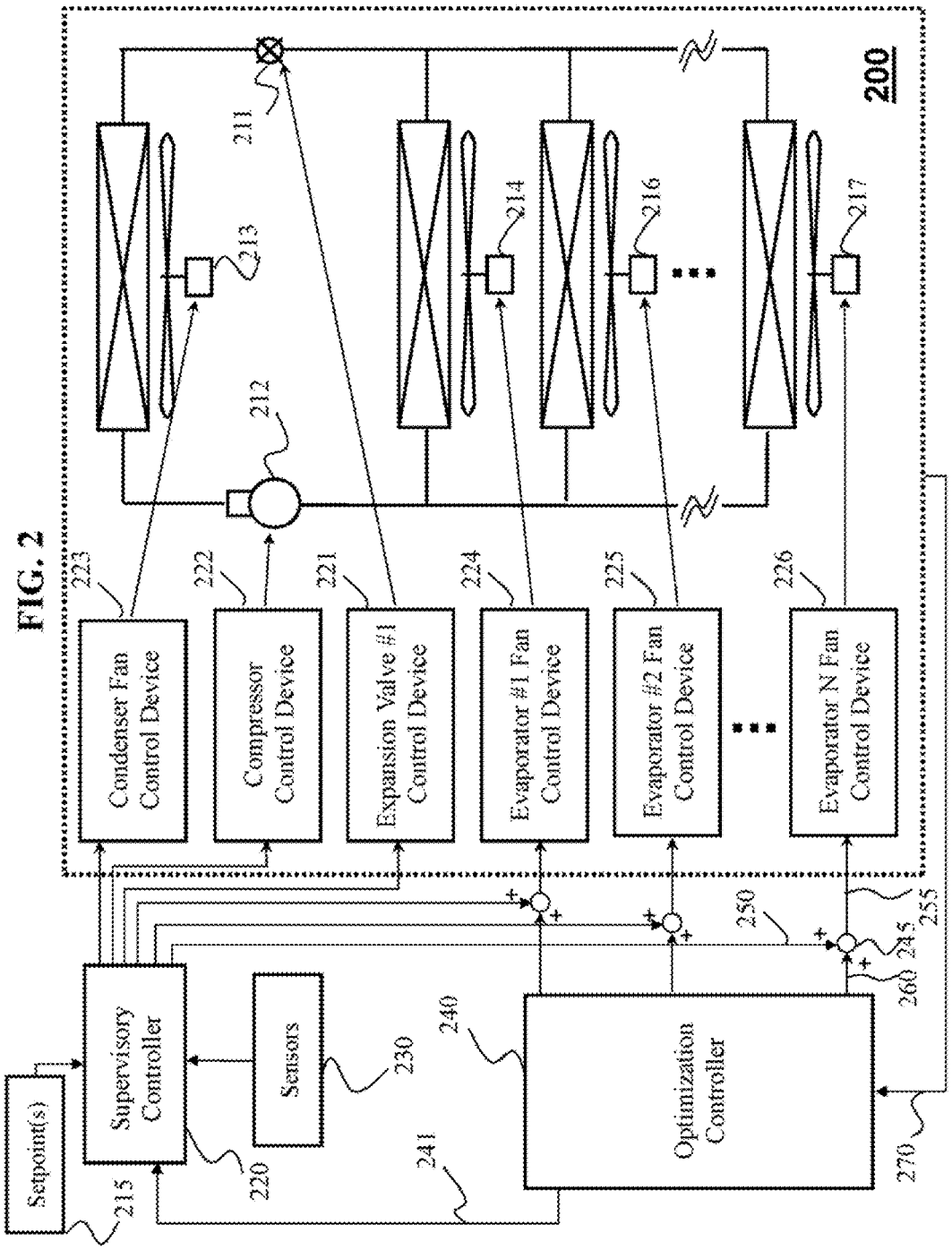
FIG. 2 is a block diagram of an optimizing controller integrated with a multi-unit vapor compression system according to some embodiments of the invention.

FIG. 2 shows a block diagram of a vapor compression system 200 according to one embodiment of the invention. The system 200 can include one or more evaporator fans 214, a condenser fan 213, an expansion valve 211, a compressor 212, a compressor control device 222, an expansion valve control device 221, an evaporator fan control device 224, and a condenser fan control device 223.

The system 200 can be a multi-unit system that includes more than one of a type of heat exchanger. For example, the system may include a second evaporator fan 216 controlled by a corresponding second evaporator fan control device 225. In another example, the system may include Nth evaporator fans 216-217 controlled by a corresponding Nth evaporator fan control device 225-226. The vapor compression system 200 is controlled by a supervisory controller 220 responsible for accepting setpoints 215 and readings of a sensor 230, and outputting a set of control signals for operation of the components of the system 200. Other configurations of the system 200 are possible.

The system 200 is controlled by an optimization controller 240 for modifying a control signal output by the supervisory controller to at least one control device, and optionally to multiple control devices. For example, the optimization controller modifies the control signal output to one of the evaporator fan control devices, for example the Nth evaporator fan control device 226. In one embodiment, the optimization controller modifies 245 the control signal 250 generated by the supervisory controller by adding a modification signal 260 to produce a modified signal 255. The modification signal includes a perturbation signal. The perturbation signal is a sinusoidal signal having a particular frequency. In one embodiment, the modification signal also includes a modification value.

The objective of the optimization controller is to optimize the performance of the system measured in accordance with a metric of performance. Examples of the metric include, but are not limited to, energy consumed by the system during the operation, and efficiency of the system.

The optimization controller receives an output signal 270 of the vapor compression system representing the performance of the system measured in accordance with the metric of performance. For example, the output signal can represent the energy consumed by the system. The output signal includes a metric signal representing a perturbation in the performance of the system caused by the modification signal. The metric signal is a sinusoidal signal having a response frequency substantially equal to the first frequency of the perturbation signal.

In various embodiments, multiple actuators can be concurrently optimized by adding perturbations of differing frequencies to individual actuators. For example, the perturbation signal generated by the optimization controller and sent to the evaporator #1 fan control device 224, is of a different frequency than the perturbation signal generated by the optimization controller and sent to the evaporator #2 fan control device 225. The resulting output signal 270 is then a mixture of signals containing frequency components of all perturbation signals.

In various embodiments, the optimization controller adjusts the control signal based on a function of a phase between the perturbation signal and the metric signal, such that the performance is optimized. For example, the optimization controller determines the modification value, e.g., as a function of the phase, and adds this modification value to the modification signal 260. Additionally or alternatively, the optimization controller can transmit 241 the modification valued to the supervisory controller in order to modify the control signal 250.

Figure 3A:
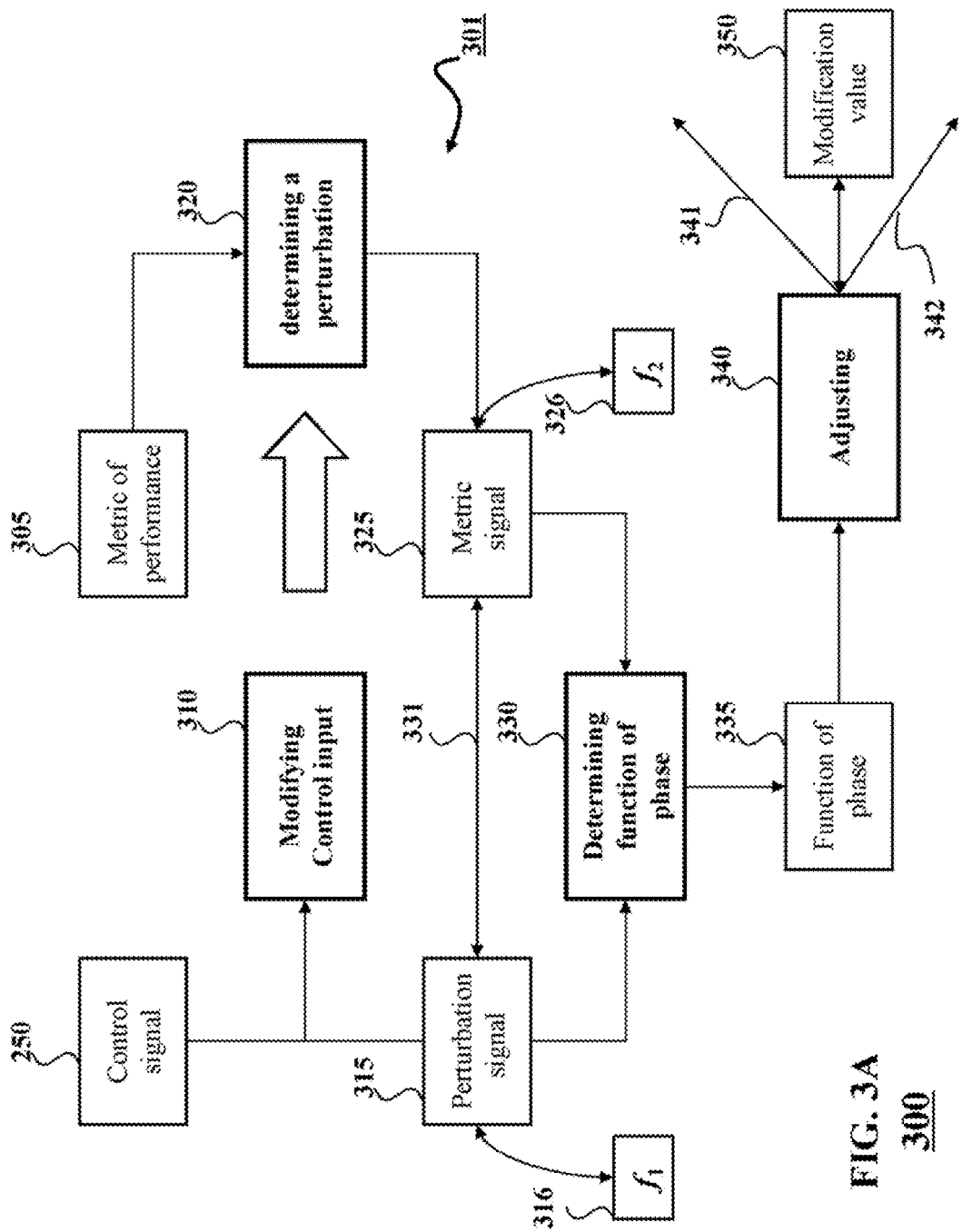
FIGS. 3A-3B shows flow diagrams of a method for optimizing a performance of the system according to various embodiments of the invention.

FIG. 3A shows a block diagram of a method 300 for controlling the operation of one actuator in a multi unit vapor compression system in accordance with one embodiment, such that the performance is optimized in accordance with the metric of performance 305. The method 300 can be applied N times where N is the number of actuators to concurrently control with the optimization controller. In various embodiments, steps of the method are performed by a processor 301. In some embodiments, the methods 300 for the actuators are preformed concurrently.

The control signal 250 is modified 310 with the modification signal including a perturbation signal 315 having a particular perturbation frequency 316. A metric signal 325 representing a perturbation in the performance of the system caused by the modification signal is determined 320, wherein the metric signal has a response frequency 326 substantially equal 331 to the perturbation frequency 315.

Next, the value of the control signal 250 is adjusted 340 based on based on a function of a phase 325 determined 330 between the perturbation signal and the metric signal. In various embodiments, the function of the phase includes one or combination of a sign of the phase or a shift of the phase. The control signal is adjusted such that the performance is optimized. For example, in one embodiment, the metric of performance is the energy consumption of the system, and thus, the performance should be minimized. In this embodiment, the adjusting includes decreasing 342 the value of the control signal, if the phase is positive; and increasing 341 the value of the control signal, if the phase is negative.

In alternative embodiment, the metric of performance is the efficiency of the system, and the performance should be maximized. In this embodiment, the changing includes increasing 341 the value of the control signal, if the phase is positive; and decreasing 342 the value of the control signal, if the phase is negative. Some embodiments determine a modification value 350 and adjust the control signal based on the modification value. One embodiment adjusts the control signal with the modification value by commanding the supervisory controller to add the modification value to the control signal 250. Another embodiment, adjusts the control signal with the modification value by adding the modification value to the modification signal. In this embodiment, the control signal is adjusted with the modification value during the modification 245.

Figure 3B:
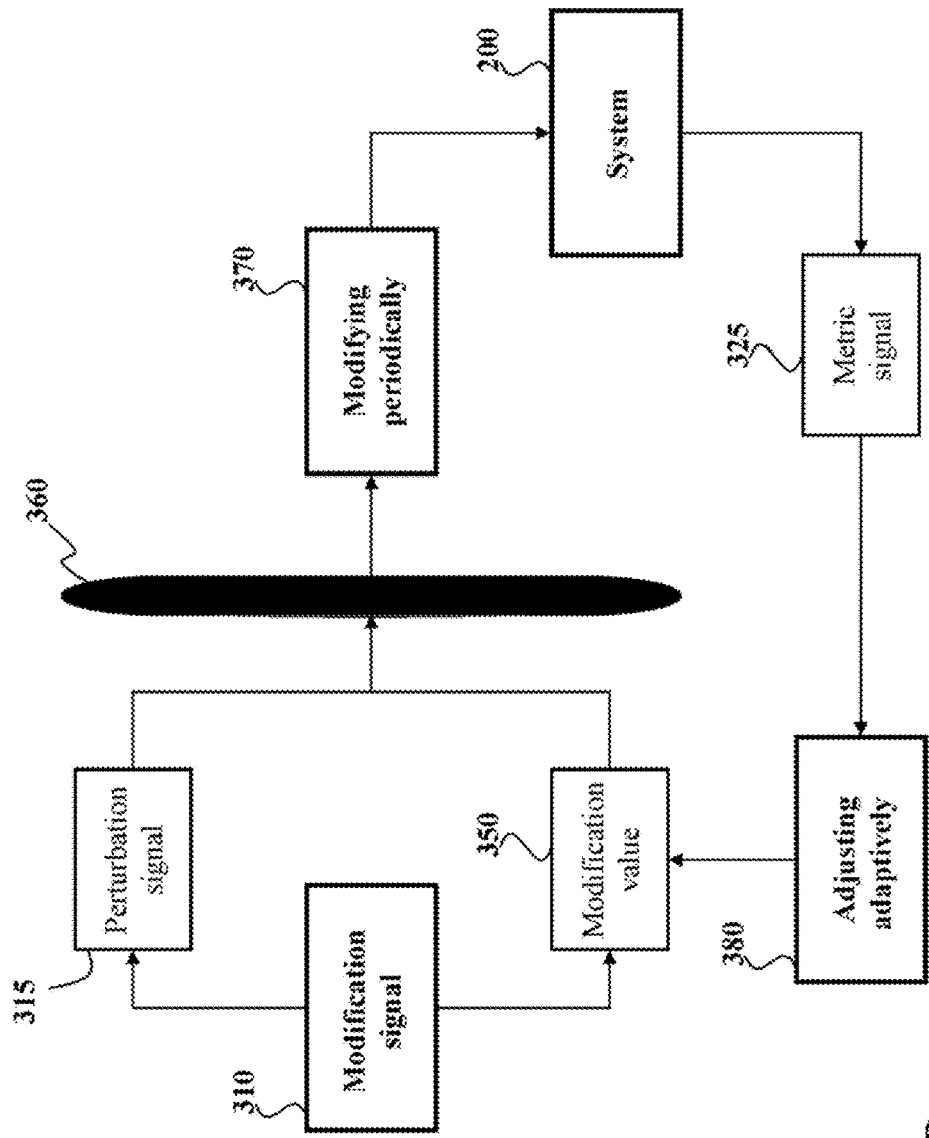

FIG. 3B shows a diagram of embodiments that modify the control signal periodically with the modification signal during at least a part of the operation of the vapor compression system. The modification signal includes the modification value 350 and the perturbation signal 315. During the operation, the modification value is adjusted 380 adaptively as a function of the metric signal 325 and the perturbation signal 315. Typically, the perturbation signal remains unchanged, but the metric signal is changing in response to the modification of the control signal. The control signal is modified periodically 370 due to a delay 360 which may be required for the system 200 to react to the modifications, such that the metric signal is changed and reached a steady state. Next, the modification value is adjusted, e.g., increased or decreased, to adapt to the changes in the metric signal caused by previous modification.

Figure 4A:
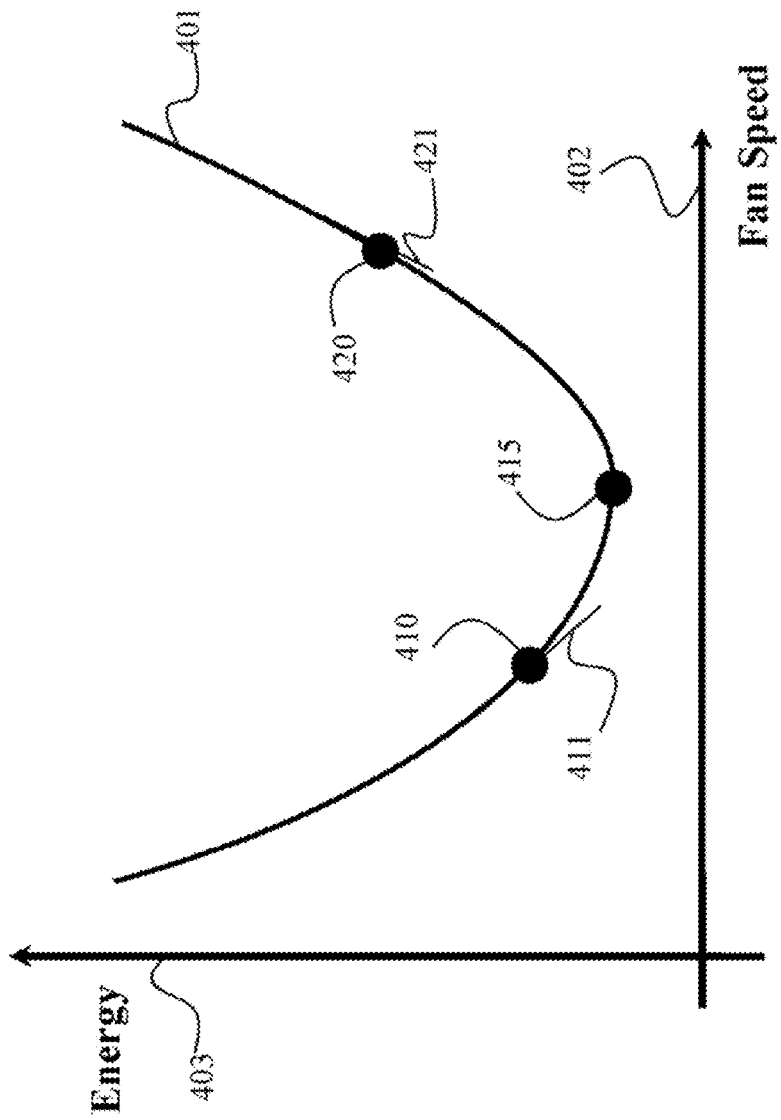
FIG. 4A is graph of a convex relationship between a heat exchanger fan speed and energy consumed by the vapor compression system.

FIG. 4A shows a performance curve 401 illustrating the convex relationship between a performance metric, e.g. energy 403 consumed by the system, and one of the system actuators, e.g., the speed 402 of one evaporator fan. The dependence of the performance metric on only one actuator is used here for clarity and to provide a simple illustration. A convex characteristic emerging from two actuators is shown in FIG. 4C, and the method is intended to function when a convex relationship exists between a performance metric and multiple actuators.

Referring to the single actuator example of FIG. 4A, a point 415 corresponds to an operating point, where current speed of the fan speed is optimal, e.g., the speed of the fan causes the system to operate at minimum energy consumption. A point 410 corresponds to an operating point where the current speed of the fan is lower than the optimal speed, and a point 420 corresponds to an operating point where the current speed of the fan is higher than the optimal speed. In various embodiments, the energy refers to total or overall energy consumed by the entire vapor compression system.

Some embodiments are based on a realization that a slope 411 and a slope 421 can indicate whether the control signal corresponding to the speed of the fan should be decreased or increased to optimize the performance. For example, the slope 411 indicates that that the speed of the fan should be increased in order to minimize the energy. In contrast, the slope 421 indicates that the speed should be decreased.

Figure 4B:
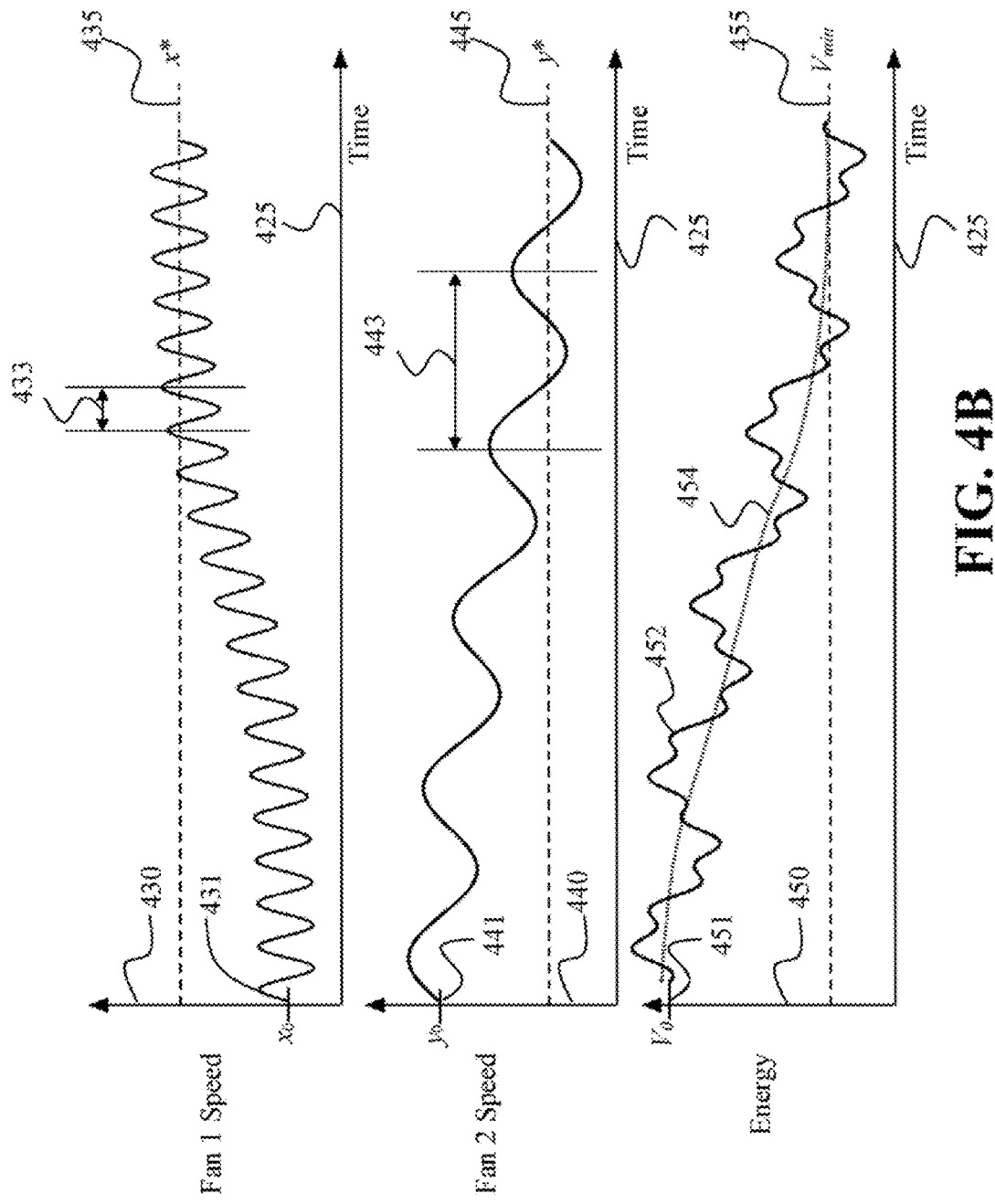
FIG. 4B is a timing diagram of time series evolution of commands sent to multiple actuators and the corresponding response of a performance metric.
Figure 4C:
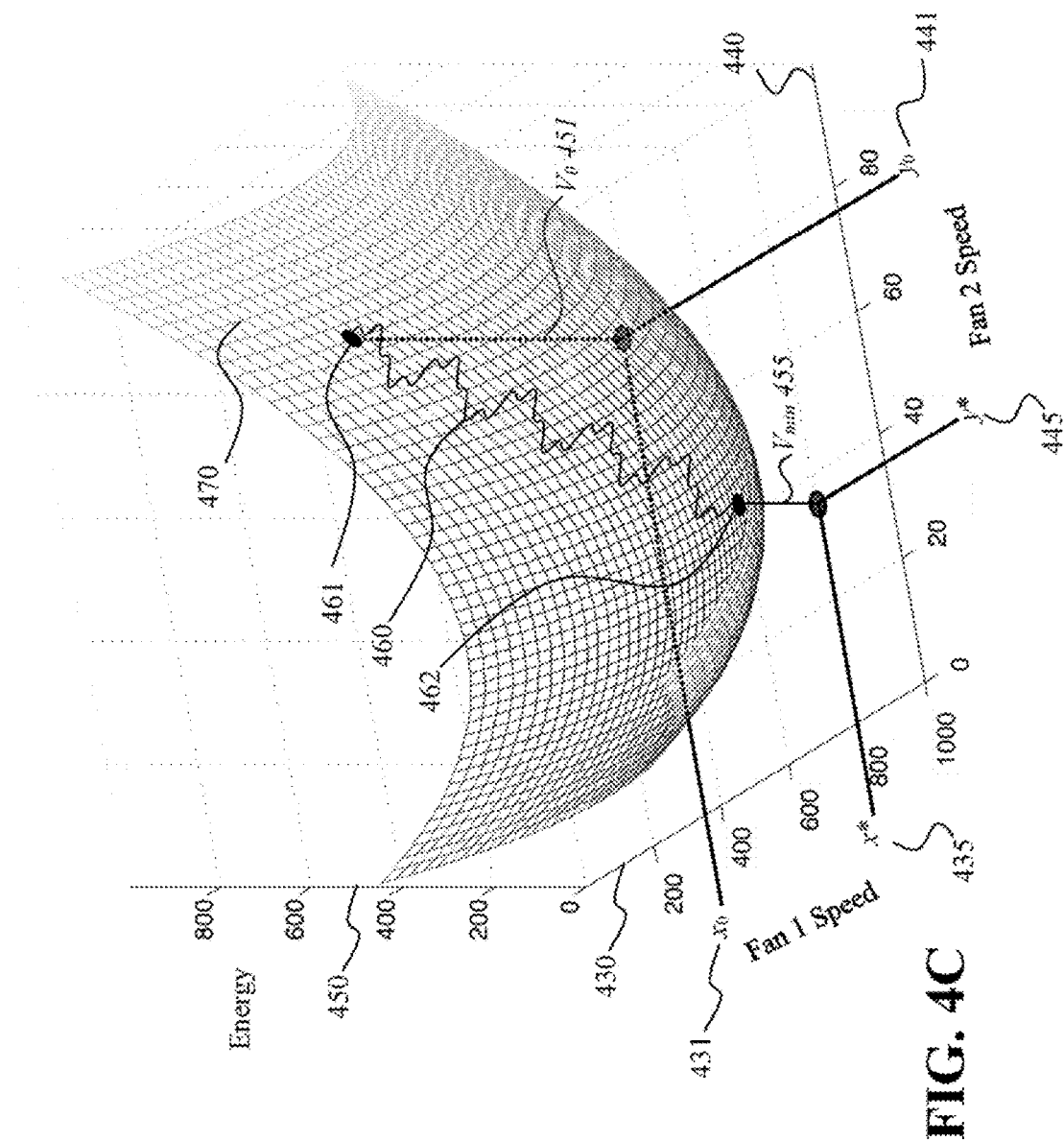
FIG. 4C is a graph of a multivariable convex relationship and illustrates how the invention concurrently drives actuators from starting values to values that minimize a performance metric.

FIG. 4B shows the time series evolution of multiple actuators, e.g., fan 1 speed 430 and fan 2 speed 440 as functions of time 425. Also, a performance metric is shown, e.g., energy 450 consumed by the vapor compression system as a function of time 425. The system actuators are modified by the energy optimizing controller such that they have a sinusoidal perturbation. For example, fan speed 1 is modified by a sinusoidal perturbation of one particular frequency, yielding a corresponding period 433, and fan speed 2 is modified by a different sinusoidal perturbation, yielding a corresponding period 443. These sinusoidal perturbations each cause a corresponding response in the metric of performance, which therefore consists of a mixture of frequency components that are due to the multiple perturbation frequencies applied to individual system actuators. The phase relationship between a particular perturbation signal and the corresponding response in the metric signal indicate whether the corresponding average actuator command signal at the current operating point is greater than or less than the optimal command signal. The optimizing controller uses this information to concurrently drive each of the system actuators to values that optimize the performance metric. For example, fan 1 may start with an initial speed $x_0$ 431 that is slower than the value that minimizes power, and therefore the optimizing controller will increase the average fan 1 speed until it reaches the speed that optimizes the performance metric, $x^*$ 435. Similarly, fan 2 may start with an initial speed $y_0$ 441 that is faster than the value that minimizes power, and therefore the optimizing controller will decrease the average fan 2 speed until it reaches the speed that optimizes the performance metric, $y^*$ 445. During the time the system actuators are being modified, the performance metric begins with a value $V_0$ 451 that is not optimal and is driven such that the average performance metric value 454 attains an optimal value, i.e., is minimized to a value of $V_{min}$ 455.

FIG. 4C shows the energy consumed by the system as a function of two vapor compression system actuators, e.g., a first evaporator fan speed and a second evaporator fan speed in a multi-unit vapor compression system. A similar relationship exists in a single unit vapor compression system where the energy consumed is plotted against the evaporator fan speed and the condenser fan speed. A convex relationship may also exist between energy consumed and more than two actuators in a multi-unit vapor compression system, but this higher dimensional relationship is difficult to view in a single figure.

The surface 470 represents a constant thermal load delivered by the vapor compression system under different combination of actuator settings. That is, for each combination of fan speed 1, fan speed 2 and the remaining system actuators (not shown in the figure), where the entire system is operated such that a fixed amount of heat is transported by the system (e.g., a fixed thermal load of, for example $Q_{load}$=1,000 W), the energy consumed by the vapor compression system varies according to the surface 470. The initial selection of fan speeds $x_0$ 431 and $y_0$ 441 may be not optimal, and cause the system to consume an amount of energy denoted $V_0$ 451. This operating point is shown on the surface at 461.

Under direction of the optimizing controller 240, multiple actuators are perturbed with sinusoids of differing frequencies, and the performance metric correspondingly responds. By comparing the phase relationship between the performance metric and the particular actuator at the frequency the particular actuator was perturbed, the optimizing controller discovers whether the current operating point of the particular actuator is larger or smaller than the value that optimizes the performance metric. For example, fan speed 1 may be driven to a value $x^*$ 435 that minimizes energy, and fan speed 2 may be driven to a value $y^*$ that minimizes energy. The resulting optimal operating point is shown in FIG. 4C on the surface at 462. The supervisory controller 220 maintains the remaining actuator commands such that the regulated variables are driven to their setpoints, and therefore the total heat delivered by the vapor compression system matches the load in the steady state. In this manner, the surface of constant thermal load is traversed until the minimum energy consumption point 462 is reached.

The rationale of the embodiments and the convex relationship of the sinusoidal signals are further explained with help of an example where a single system actuator is modified by the optimizing controller, and with reference to FIGS. 5A-5C. Suppose a single unit vapor compression system is operating in cooling mode (the indoor heat exchanger is an evaporator) and the goal is to regulate the indoor temperature while consuming the minimum possible energy. For the purpose of this example, an initial steady state operating point on the curve is 410, so that the speed of the fan is too low for optimal energy consumption and the indoor room temperature equals the setpoint temperature. A supervisory controller generates P vapor compression system control signals. The P-1 control signals are sent directly to the respective control devices and value of one control signal is modified by the optimization controller.

The optimization controller adds to the control signal a signal $s_1(t)$ 510, which includes the perturbation signal $A_1 \sin(wt)$ and the modification value $s_{m1}$ 520. The sinusoidal perturbation enables estimation of the slope of the curve of the index of performance, as described below.

For example, the initial part of the sinusoidal perturbation signal $s_1(t)$ 510 is increasing, i.e. sin(wt) function started at t=0. The increasing part of the sinusoidal signal causes the speed of the fan to increase, which in turn increases the heat transfer across the evaporator and lower the indoor temperature. The supervisory controller detects this lowered temperature as part of its normal function and commands the compressor to decrease its speed since less cooling is needed to achieve the setpoint temperature.

Because the compressor consumes the largest amount of energy in the vapor compression system, the overall energy consumption is decreased. This decrease is measured as output signal of the performance $V_1(t)$ 530 having phase, i.e., due to the metric signal, opposite of the perturbation signal. Because the phase of $V_1(t)$ 530 is shifted by about 180 degrees as compared to $s_1(t)$ 510, the slope of the curve at the current operating point 410 is determined to be negative. The optimization controller uses this slope information to change the modification value $s_{m1}$ 520 of the modification signal in such a way as to cause energy consumption value $V_{m1}$ 540 to approach its optimum value. The optimization controller continues changing the modification value of the speed of the evaporator fan until a minimum in energy consumption is reached, and the system is operating at point 415. In this manner, the optimization controller can provide a dramatic influence on energy savings.

Similarly, if the initial operating point of the vapor compression system is at the point 420 and a sinusoidal perturbation signal $s_2(t)$ 550 is applied, the energy response $V_2(t)$ 570 is largely in phase with the sinusoidal perturbation, and the optimization controller determines that the slope of the performance curve at the current operating point is positive. Therefore, the optimization controller decreases the modification value of the command input $s_{m2}$ 560 causing the energy consumed $V_{m2}$ 580 to decrease, ultimately driving the system to operate at point 415.

In some of the above examples, the metric of performance is energy consumption and therefore the object is to minimize the performance. Some embodiments use an alternative metric of performance, e.g., an efficiency of the system. Those embodiments modify the optimization controller to maximize the performance.

Figure 6:
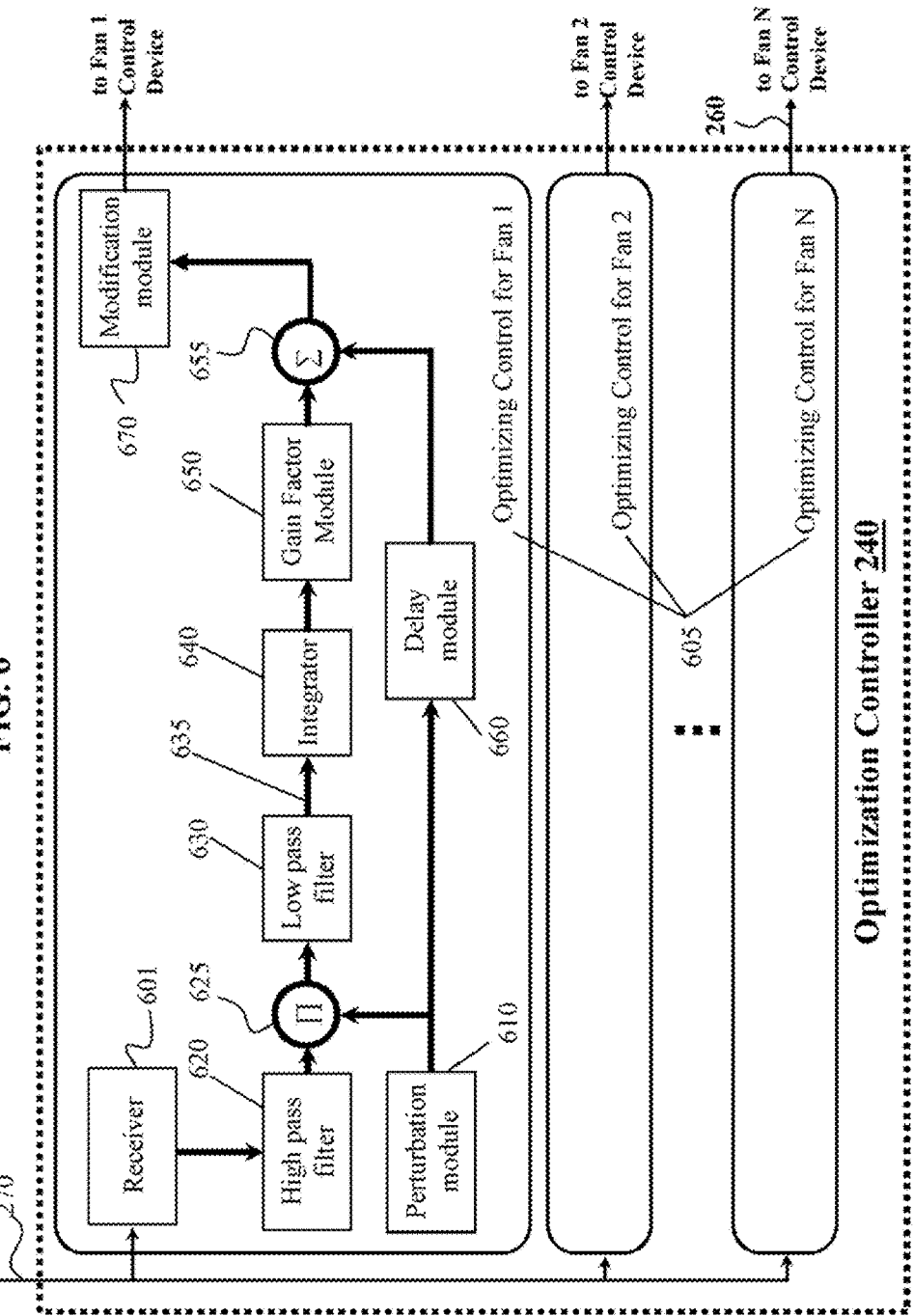
FIG. 6 is a graph of an optimization controller consisting of an array of optimizing actuator controllers according to one embodiment of the invention.
Figure 7:
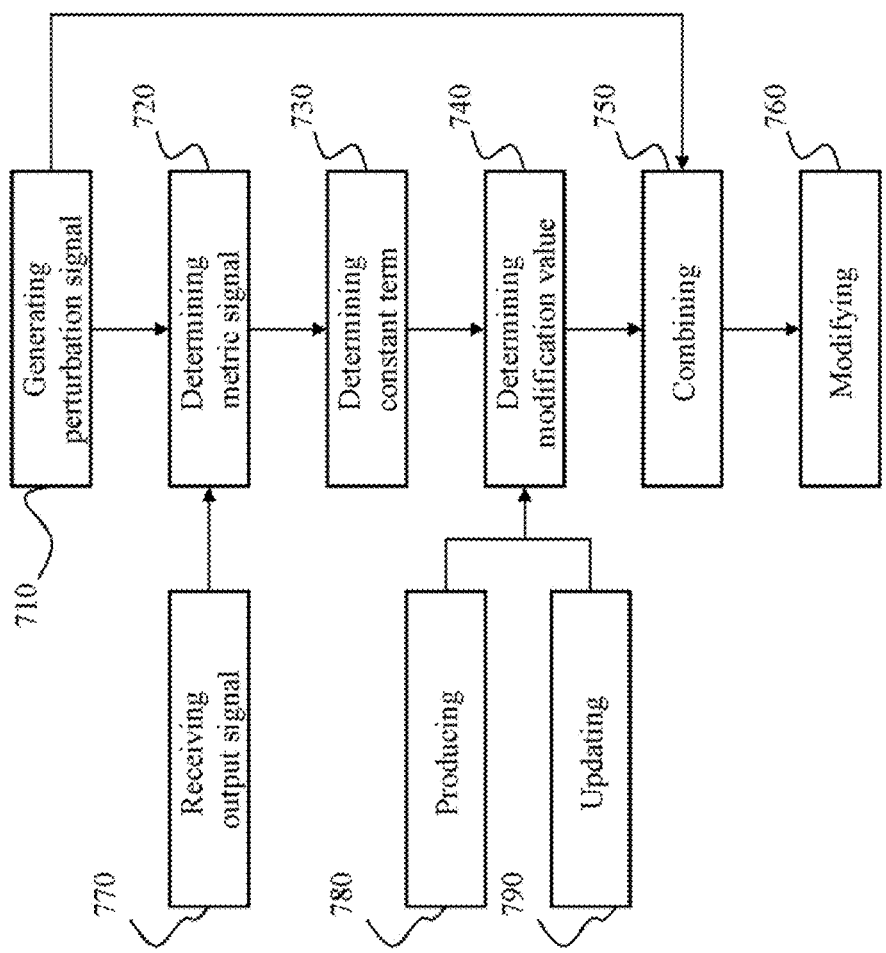
FIG. 7 is a flow chart of method of operation of the optimization controller of FIG. 6.

FIG. 6 shows a block diagram of an optimization controller 240 according to one embodiment of the invention. FIG. 7 shows a flow chart of method of operation of the optimization controller 240. FIGS. 6-7 are provided for illustration purpose only, and are not indented to limit the scope of the invention. In various embodiments, the configuration of the optimization controller includes one or some of the described components.

Referring to FIGS. 6 and 7, the optimization controller 240 can include a repeated array of optimizing actuator controllers 605 where each optimizing actuator controller can include one or some of the following components. A perturbation module 610 for generating 710 a perturbation signal 315, and a receiver 601 for receiving 770 or measuring the output signal 270 of the vapor compression system representing the performance in accordance with the metric of performance. During the operation, the output signal V(t) includes the metric signal B sin(wt) 325 in addition to a nominal value Vm.

The optimization controller can include a high-pass filter 620 for determining 720 a metric signal in response to receiving the output signal, and a low-pass filter 630 for determining 730 a constant term of a product 625 of the perturbation signal and the metric signal. The high-pass filter is designed to remove the nominal value Vm from the output signal and to produce the metric signal. The metric signal may include other high frequency components originating from other sources such as noise. The metric signal has a component that is of the same frequency as the perturbation signal, and when two sinusoids of the same frequency are multiplied, the resulting expression has a constant term and a sinusoidal term according to $$\sin(wt)*B\sin(wt)=B/2-B/2*\cos(2wt).$$

The function of phase, and the slope of the performance curve, is encoded in the constant term B/2. If both sinusoidal signals are in phase (as with $s_2(t)$ 550 and $V_2(t)$ 570 in FIG. 5), then the constant term is positive. However, if the slope of the performance curve at the current operating point is negative, the two sinusoids are out of phase (as with $s_1(t)$ 510 and $V_1(t)$ 530 in FIG. 5) and the right hand side of the above equation has a negative constant term. The optimization controller uses the sign of the constant term B/2 to determine the slope of the performance curve.

Because, in one embodiment, only the constant term B/2 is required, the sinusoidal term with twice the perturbation frequency is removed using a low-pass filter 630.

The optimization controller can include an integrator 640 for determining 740 the modification value 350 based on a sign of the constant term 635.

The sign of the constant term indicates if the current modification value $s_m$ is too large or too small compared to the value of s that optimizes the value V of the performance metric. The integrator 640 integrates the constant term B/2 in order to determine how to change the modification value based on the slope information. In various embodiments, the integrator produces 780 new value of the modification value, or updates 790 a previous value of the modification value.

The optimization controller can also include a gain factor module for multiplying the modification value by a gain factor, wherein a sign of the gain factor depends on the metric of performance. Usually, the multiplication by the gain factor serves two goals. First, the gain factor determines the speed at which the optimization controller reacts to the slope information. For example, a low magnitude of the gain factor causes slow modifications to the value of the control signal. Second, the sign of the gain factor determines whether the optimization controller maximizes or minimizes the index of performance. In the embodiments where the performance such as the energy consumption has to be minimized, the sign of gain factor K is negative. When the gain factor K is negative and the constant term is negative then the value of the control signal is increased. This is consistent with searching for a minimum in the performance curve. In the embodiments where the performance has to be maximized, the gain factor K is positive. The gain factor module simplifies adaptation of the optimization controller for different objectives of the vapor compression system.

The optimization controller can also include an summation module 655 for combining 750 the modification value with the perturbation signal to output the modification signal 315 suitable for modifying the control signal of at least one component of the system, such that the performance is optimized. Some embodiments also include a modification module for modifying the control signal with the modification signal.

In some embodiments, the optimization controller also includes a delay module 660 to accept the perturbation signal. The delay module compensates for delays induced by the dynamics of the vapor compression system. Typically, the delay module is not required if the frequency of the perturbation signal is substantially slower than the dominant dynamics of the vapor compression system.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for operating a vapor compression system, comprising the steps of:
    generating a set of perturbation signals having different frequencies for a set of actuators;
    modifying each control signal of a set of control signals with a corresponding modification signal of a set of modification signals, wherein each modification signal includes a perturbation signal;
    determining a metric signal representing perturbations in the system caused by the set of modification signals, where said metric signal is determined using a high pass filter responsive to receiving an output signal representing an energy consumption of the vapor compression system;
    subjecting a product of the perturbation signal and a corresponding frequency component of the metric signal to a low pass filter to produce a constant term of the product, wherein a sign of the constant term corresponds to a function of a phase;
    determining a modification value based on the constant term, wherein the constant term is integrated to produce an updated modification value; and
    adjusting a value of each modification signal based on a function of a phase between the modification signal and a corresponding frequency component of the vapor compression system, wherein the steps of the method are performed by a processor.

2. The method of claim 1, wherein the function of the phase includes at least one of a sign of the phase, and a shift of the phase.

3. The method of claim 2, wherein the metric is an efficiency of the vapor compression system, and wherein the adjusting comprises:
    increasing a value of the modification signal, if the phase is positive; and
    decreasing the value of the modification signal, if the phase is negative.

4. The method of claim 2, wherein the metric is an energy consumption of the vapor compression system, and wherein the adjusting comprises:
    decreasing a value of the modification signal, if the phase is positive; and
    increasing the value of the modification signal, if the phase is negative.

5. The method of claim 1, further comprising:
    subjecting the metric signal to a set of high-pass filters to produce a set of frequency components of the metric signal.

6. The method of claim 1, wherein the determining the modification value further comprises:
    multiplying the modification value with a gain factor, wherein a sign of the gain factor depends on a metric of performance.

7. The method of claim 1, further comprising:
    combining the modification value with the perturbation signal to produce the modification signal for a corresponding command signal.

8. The method of claim 1, wherein the vapor compression system includes at least two controlled components of a same type.

9. A method for controlling an operation of a vapor compression system, such that a performance of the system measured in accordance with a metric of the performance is optimized, comprising the steps of:
    generating a set of perturbation signals having a set of unique frequencies for a set of actuators;
    modifying concurrently a set of control signals with a corresponding set of modification signals, wherein each modification signal includes a perturbation signal;
    determining a metric signal representing perturbations in the performance of the system caused by the set of modification signals, where said metric signal is determined using a high pass filter responsive to receiving an output signals representing an energy consumption of the vapor compression system;
    subjecting a product of the perturbation signal and a corresponding frequency component of the metric signal to a low pass filter to produce a constant term of the product, wherein a sign of the constant term corresponds to a function of a phase;
    determining a modification signal based on the constant term, wherein the constant term is integrated to produce an updated modification value; and
    adjusting each control signal based upon a corresponding frequency component of the metric signal, wherein the steps are performed by a processor.

10. The method of claim 9, wherein the adjusting comprises:
    adjusting a control signal based on a function of a phase between the corresponding perturbation signal and the frequency component of metric signal, such that the performance is optimized.

11. An optimization controller for optimizing a performance of a vapor compression system measured in accordance with a metric of performance, comprising;
    a perturbation module for generating a set of perturbation signals, each perturbation signal of said set each comprises a unique frequency or a different frequency for a set of actuators;
    a set of high-pass filters corresponding to the frequencies of the perturbation signals for determining a set of frequency components of a metric signal in response to receiving an output signal representing the performance of the system;
    a set of low-pass filters for determining constant terms of products of each perturbation signal and corresponding frequency component of the metric signal;
    a set of integrators for determining a set of modification values for a corresponding set of command signals based on signs of the constant terms;
    a modification module for modifying the set of corresponding command signals based on the set of modification values, wherein the set of corresponding command signals are adjusted based on a function of a phase between a perturbation signal and the metric signal, wherein the adjusting includes decreasing a value of a control signal if the phase is positive, and increasing a value of the control signal if the phase is negative.

* * * * *